United States Patent
Khalili et al.

(10) Patent No.: US 9,982,931 B2
(45) Date of Patent: May 29, 2018

(54) SYSTEMS AND METHODS FOR CONTROLLING REFRIGERATION CYCLES OF SORPTION REACTORS BASED ON RECUPERATION TIME

(71) Applicant: ROCKY RESEARCH, Boulder City, NV (US)

(72) Inventors: Kaveh Khalili, Boulder City, NV (US); Uwe Rockenfeller, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 458 days.

(21) Appl. No.: 14/698,563

(22) Filed: Apr. 28, 2015

(65) Prior Publication Data

US 2016/0320101 A1    Nov. 3, 2016

(51) Int. Cl.
   *F25B 15/00*    (2006.01)
   *F25B 49/04*    (2006.01)

(52) U.S. Cl.
   CPC .................. *F25B 49/046* (2013.01)

(58) Field of Classification Search
   CPC .................................................. F25B 49/046
   USPC .................................................. 62/141–147
   See application file for complete search history.

(56) References Cited

U.S. PATENT DOCUMENTS

| | | | | |
|---|---|---|---|---|
| 3,550,391 A * | 12/1970 | Greacen | ................. | F25B 15/06 62/103 |
| 3,651,654 A * | 3/1972 | Rachfal | ................. | F25B 15/008 62/103 |
| 3,651,655 A * | 3/1972 | Dyre | ................. | F25B 15/008 62/103 |
| 4,169,362 A * | 10/1979 | Weil | ................. | F24F 3/1423 62/478 |
| 4,207,751 A * | 6/1980 | Kampfenkel | ............ | F25B 15/04 62/141 |
| 4,322,951 A * | 4/1982 | Alfano | ................. | F25B 15/06 62/101 |
| 4,487,026 A * | 12/1984 | Alfano | ................. | F25B 15/06 62/101 |
| 4,596,122 A * | 6/1986 | Kantner | ................. | F25B 33/00 62/141 |
| 5,025,635 A * | 6/1991 | Rockenfeller | ........ | F25B 17/083 62/106 |

(Continued)

OTHER PUBLICATIONS

International Search Report and Written Opinion in Application No. PCT/US2016/027561 dated Jul. 11, 2016.

*Primary Examiner* — Ljiljana Ciric
(74) *Attorney, Agent, or Firm* — Knobbe Martens Olson & Bear LLP

(57) ABSTRACT

A control system is used for controlling the equalization of pressure between absorbing and desorbing reactors. In a first reaction cycle in a desorbing reactor a gaseous reactant is desorbed from a solid sorbent and concurrently in an absorbing reactor the gaseous reactant is absorbed on a solid sorbent. In a second reaction cycle, absorption and desorption are reversed in the reactors and at least a portion of the gaseous reactant desorbed from in the desorbing reactor is transferred to the absorbing reactor in an equalization process under computer control. The computer control may detect the demand on the system and adjust the amount of time for the equalization process to increase the efficiency of the system.

18 Claims, 2 Drawing Sheets

(56) References Cited

U.S. PATENT DOCUMENTS

| | | | | |
|---|---|---|---|---|
| 5,079,928 A * | 1/1992 | Rockenfeller | ........ | F25B 17/083 62/106 |
| 5,161,389 A * | 11/1992 | Rockenfeller | ........ | F25B 17/083 62/106 |
| 5,263,330 A * | 11/1993 | Rockenfeller | ........ | F25B 17/083 165/104.12 |
| 5,298,231 A | 3/1994 | Rockenfeller | | |
| 5,320,518 A * | 6/1994 | Stilger | ........ | B01J 8/06 122/4 D |
| 5,442,931 A * | 8/1995 | Ryan | ........ | F25B 17/08 165/104.12 |
| 5,477,706 A * | 12/1995 | Kirol | ........ | C09K 5/047 62/101 |
| 5,598,721 A * | 2/1997 | Rockenfeller | ........ | C09K 5/00 62/480 |
| 5,628,205 A * | 5/1997 | Rockenfeller | ........ | C09K 5/047 62/112 |
| 6,176,096 B1 * | 1/2001 | Yuri | ........ | F25B 15/02 62/141 |
| 6,244,056 B1 * | 6/2001 | Pfister | ........ | C01B 6/065 257/E23.088 |
| 6,332,328 B1 * | 12/2001 | Bangheri | ........ | F25B 49/043 62/141 |
| 6,477,856 B1 | 11/2002 | Khalili et al. | | |
| 6,550,272 B2 * | 4/2003 | Nakajima | ........ | F25B 15/008 62/141 |
| 8,145,363 B2 | 3/2012 | Bean et al. | | |
| 8,205,465 B2 | 6/2012 | Huerta-Ochoa | | |
| 8,915,451 B2 * | 12/2014 | Takahashi | ........ | F24F 3/1405 236/44 A |
| 2003/0070438 A1 * | 4/2003 | Kikuchi | ........ | F24F 11/006 62/141 |
| 2005/0251293 A1 * | 11/2005 | Seigel | ........ | F24F 11/0086 700/276 |
| 2010/0077752 A1 * | 4/2010 | Papile | ........ | B01D 53/08 60/641.8 |
| 2010/0192603 A1 * | 8/2010 | Boudard | ........ | F25B 49/043 62/141 |
| 2012/0000220 A1 * | 1/2012 | Altay | ........ | B64D 13/06 62/101 |
| 2014/0250927 A1 * | 9/2014 | Yoshida | ........ | F25B 17/083 62/101 |
| 2016/0252285 A1 * | 9/2016 | Rubinstein | ........ | F25B 15/04 62/141 |

\* cited by examiner

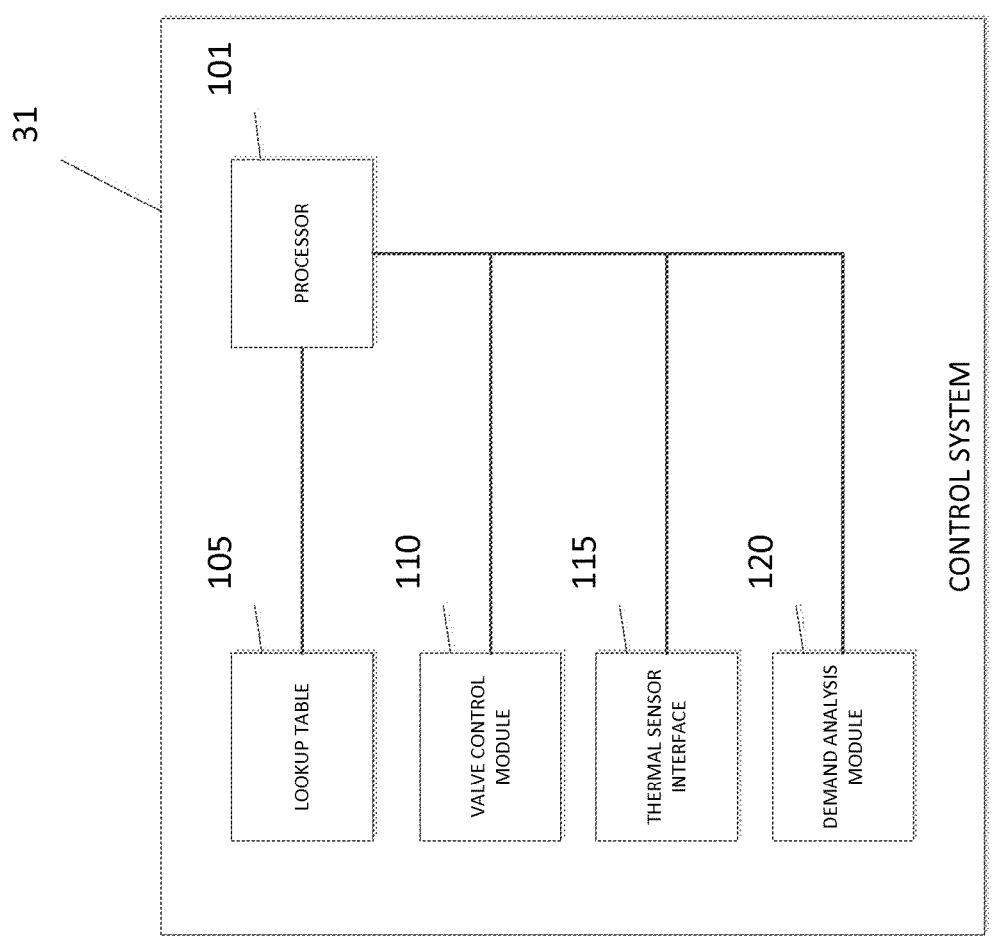

SYSTEMS AND METHODS FOR CONTROLLING REFRIGERATION CYCLES OF SORPTION REACTORS BASED ON RECUPERATION TIME

FIELD OF THE INVENTION

This application relates to systems and methods for controller refrigeration cycles. More particularly, this application relates to cooling systems having electronic controllers that control the recuperation time between reactor systems.

BACKGROUND

In solid-vapor sorption reaction systems, a gaseous reactant is alternately absorbed and desorbed on a solid sorbent in one or more reaction chambers in a sorber or reactor. Where multiple reactors are used the system can operate in substantially opposing phases, or half-cycles, with one reactor or bank of reactors desorbing the gaseous reactant from the solid sorbent while the other reactor or bank of reactors is absorbing the gaseous reactant on the solid sorbent.

Once the reactant is desorbed from the solid sorbent it can be directed to one or more condensers. After condensation, the condensate is then directed to one or more evaporators where it is vaporized back into a gas. During this process, heat may be rejected from the condenser and cooling may be recovered from the evaporator.

In other systems, the reactors are used instead of condensers and evaporators for recovering energy from the refrigerant. Desorption is carried out by heating the solid sorbent on which the gaseous reactant has been absorbed. Electric, steam, or gas-driven heaters are typically used for heating the solid sorbent. A heat transfer fluid can then be directed through a reactor heat exchanger to which the sorbent is thermally exposed. To initiate absorption, a solid sorbent, from which the gaseous reactant or refrigerant has been desorbed, is cooled to a suitable temperature whereby it draws the gaseous refrigerant from the evaporator. The reactors may also be provided with heat exchangers and piping for directing heat transfer fluid between the reactors so that heat released from an absorbing reactor is directed to a desorbing reactor to provide heating to carry out desorption. Such systems are described in, for example U.S. Pat. Nos. 5,079,928, 5,263,330, 5,477,706, 5,598,721, 5,628,205, and 6,477,856, all of which disclosures are incorporated herein by reference in their entirety.

During a reaction cycle, a first (absorbing) reactor is at a lower temperature than a second (desorbing) reactor. This means that the temperature of the solid sorbent and other components within the second reactor is higher than the temperature of the solid sorbent and all other components in the first reactor. At the end of a half-cycle, with a majority of gaseous reactant desorbed from the sorbent in the second reactor and a majority of gaseous reactant absorbed on the sorbent in the first reactor, the absorption/desorption phases are reversed.

At this half-point of the cycle, the second reactor is then cooled and the first reactor is heated. At least partial heating of the first reactor can be supplied by directing heat from the second reactor to the first reactor. This recuperation of energy from the second reactor can increase the overall energy efficiency of the system since less external heating is required to heat the first reactor.

The overall efficiency can also be increased by cooling the second reactor by transferring a portion of any condensed refrigerant to the heat exchange section of the second reactor. Such cooling may be assisted by utilizing vaporized heat transfer fluid or refrigerant for driving the liquid heat transfer fluid or refrigerant in the cooling loop, such as disclosed in U.S. Pat. No. 5,477,706.

SUMMARY

One embodiment is a cooling system. The cooling system may have a first reactor system comprising one or more first reactors configured to adsorb and desorb a gaseous reactant onto a first solid sorbent composition; a second reactor system comprising one or more second reactors configured to adsorb and desorb the gaseous reactant onto a second solid sorbent composition; a conduit connecting the one or more first reactors of the first reactor system to the one or more second reactors of the second reactor system, and comprising a controllable valve; and an electronic controller configured to control the recuperation time between the first reactor system and the second reactor systems by operating the controllable valve to equalize the pressure of the reactant gas between the first reactor system and the second reactor system.

Another embodiment is a method of controlling a cooling system that includes providing a first reactor system comprising one or more first reactors configured to adsorb and desorb a gaseous reactant onto a first solid sorbent composition; providing a second reactor system comprising one or more second reactors configured to adsorb and desorb the gaseous reactant onto a second solid sorbent composition; providing a conduit connecting the one or more first reactors of the first reactor system to the one or more second reactors of the second reactor system, and comprising a controllable valve; and electronically controlling the recuperation time between the one or more first reactors and the one or more second reactors by operating the controllable valve to equalize the pressure of the reactant gas between the first reactor system and the second reactor system.

BRIEF DESCRIPTION OF THE DRAWINGS

FIG. 2 is a schematic illustration of a two-sorber system illustrating one aspect of the invention.

DETAILED DESCRIPTION

Figure 1:
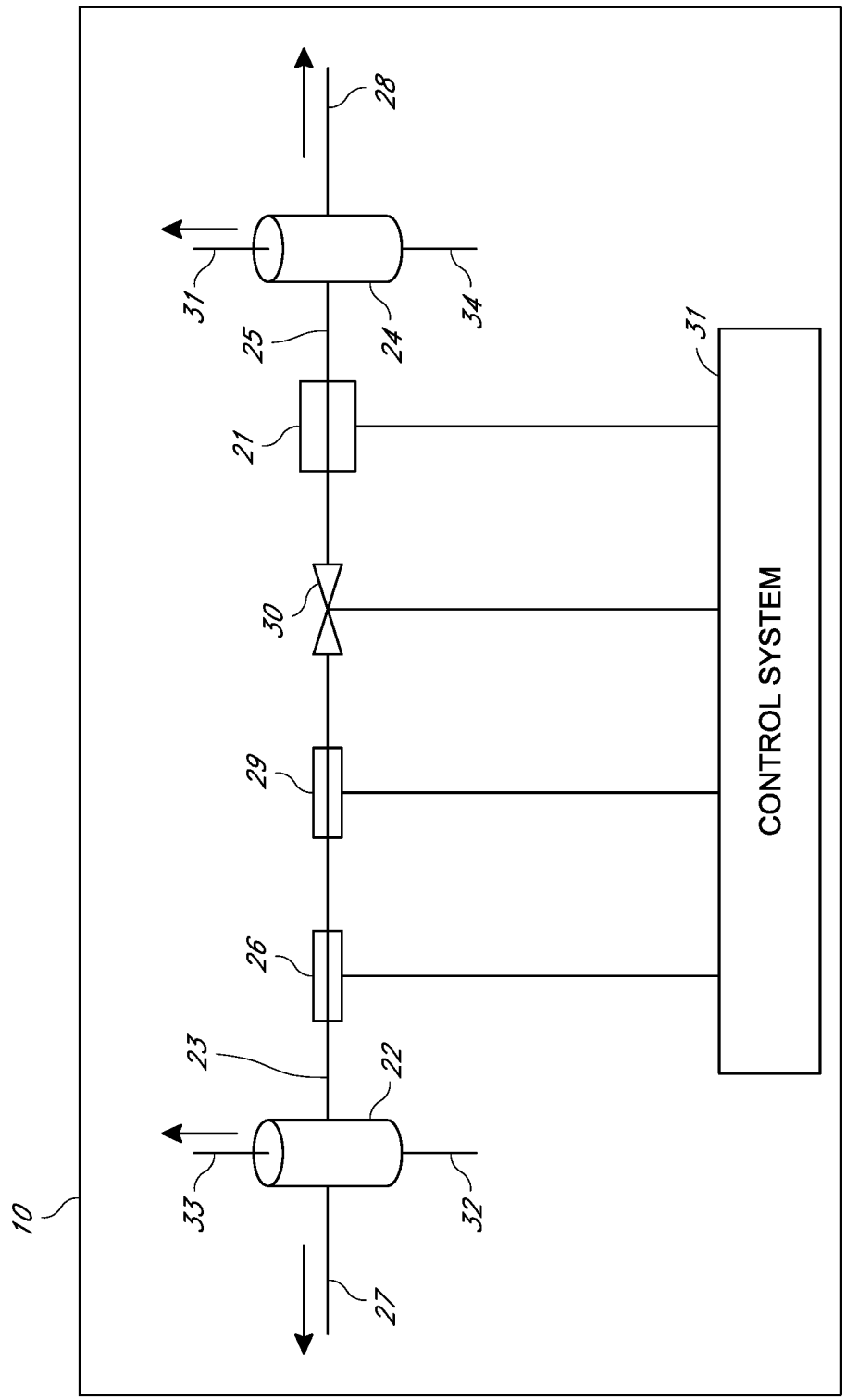
FIG. 1 is a schematic illustration of two opposing banks of reactors illustrating the piping and valve for reactor recuperation according to one aspect of the invention.

Embodiments of the invention relate to complex compound heating and cooling systems and methods that efficiently manage adsorption/desorption cycles of these systems. In use, after each half-cycle in which a first reactor has completed absorption, and the other opposing second reactor has completed desorption, the cycles are reversed. During this reversal in cycles, energy is recuperated by connecting the absorber and desorber reactors together so that a portion of the remaining absorbed gaseous reactant from the desorbing reactor is directed to the opposing reactor. As one example, the system may include piping disposed between the opposing reaction chambers to transfer the gaseous reactant from one reactor to the other. In one embodiment, an electronically controllable valve is used to control the equalization time of the recuperation between the two reactors.

During the controllable recuperation process a controllable valve can be disposed into tubing run between the absorber and desorber to precisely control the time that the sorbers are connected together. Opening the controllable valve results in a mass transfer from the high-temperature sorber to the low-temperature sorber. The mass transfer causes the temperature of the high-temperature sorber to be reduced and temperature of the low-temperature sorber to be increased.

In one embodiment, the equalization time used in the system is optimized to increase the overall efficiency of the system. For example, before the discovery of the benefits and effects of cycle pressure equalization as described herein were known, typical recovery periods of about 4 minutes were used within each system. However, it was discovered that shorter periods between about 20 seconds and 4 minutes were found to be advantageous. In some embodiments, it was found that periods as long as 4 minutes rarely increased efficiency, as capacity declines in the system exceeded gains in efficiency. This was particularly discovered when recovery times approached 4 minutes.

Increasing the time provided within a system to equalize the pressure, and thus temperature, between an absorber and desorber will increase the cycle energy efficiency because more heat can be transferred from one sorber to the other. However this increased time results in an overall decrease in capacity since the system can perform fewer cycles per unit of time. Thus, decreasing the equalization time of the sorbers will increase the overall system refrigeration capacity over the full cycle of absorption and desorption of each sorber. Embodiments of the invention provide the most efficient balance between these considerations by providing a predefined equation, a predetermined data curve or a customized lookup table that is integrated into the system and allows for custom control of the overall efficiency of the system.

In one embodiment, each complex compound system may include a specific electronic lookup table that allows the system to adjust the recuperation time depending on the efficiency needs of the system. For example, an electronic controller may be configured to detect the demand on the system and adjust the capacity of the system accordingly by adjusting the system's recuperation times. In times when greater capacity is required, the system may refer to the lookup table and adjust the recuperation time downward so that the capacity of the system increases. Although this will increase the energy demand by the system, the capacity needs may be met. However, in some situations, such as when the product or load meets the setpoint temperature in a shorter period, overall efficiency can be better than when the setpoint is reached in a longer period. Similarly, when the capacity requirements on the system are reduced, the system can refer to the lookup table to properly adjust the recuperation time upward to increase the energy efficiency. The determination of how long the reactors should equalize can also be based on other considerations. For example, this time could be based on a combination of the setpoint, the load temperature, and/or the sorber temperatures. An optimized algorithm may be used to reach the desired temperature at the most optimum time and/or efficiency The present disclosure comprises a method and apparatus for providing recuperation between two opposing sorbers or banks of sorbers in a single or multiple-stage solid-vapor sorption system utilizing the sorption energy that exists between the reactors. The method may utilize a mass-fraction of remaining absorbed vapor on the sorbent in the desorbing reactor near the completion of a half-cycle, prior to reversing the phases. The method can be carried out by utilizing piping between the reaction chambers of the opposing reactors and one or more valves for opening and closing the pipe or pipes whereby the timing of the recuperation may be selected and controlled to achieve the desired energy transfer.

As used herein, the term "compound" and "solid sorbent composition" is intended to mean any reaction product formed by absorption or adsorption and desorption of a gaseous reactant on a solid reactant, i.e., chemisorption, within the scope of the invention. "Absorption" and "adsorption" may be used interchangeably. A reactor or sorber, within the scope of intended apparatus, includes a reaction chamber containing the solid sorbent and heat exchange components including piping for directing heat transfer fluids to and from the reactor in contact with the sorbent, as well as resistive heating elements, and the like. Examples of such reactors are disclosed in the aforesaid U.S. patents, particularly U.S. Pat. Nos. 5,298,231, 5,328,671, and 5,477,706.

In chemisorption reactions, desorption is carried out at relatively high pressure and temperature while absorption is carried out at relatively low pressure and temperature. Because of the high-pressure difference between opposing absorption and desorption reactors, the time or duration required for the recuperation process is relatively short. The initiation of the recuperation during the cycle is carried out near the completion of the cycle where the remaining mass of gaseous reactant or refrigerant vapor desorbed from the solids sorbent is not usually used for producing refrigeration/cooling because of pressure and/or efficiency limitations.

In the configurable system, the recuperation is carried out near the completion of a cycle for a predetermined time to adjust efficiency of the system. In a chemisorption reaction process, the desorbing reaction temperature for a specific sorbent composition is higher than the absorption temperature of the same sorbent composition. Specific examples of absorption and desorption temperatures for a number of ammoniated complex compounds are disclosed in the tables of U.S. Pat. No. 5,079,928, the description of which are incorporated herein by reference. Temperature differentials for absorbing and desorbing compositions are well known to those skilled in the art.

The temperature differential between an absorbing and desorbing reactant is referred to as $\Delta T$. The recuperation may be carried out for a time sufficient to yield a temperature change of at least about 70%, 60%, 50%, 40%, 30%, 20%, 10% or 5% $\Delta T$. The time required to accomplish such recuperation may be between about 10 seconds to about 4 minutes. By using the recuperation process described herein, a desorbing reactor is benefited by temperature reduction whereby less cool-down is needed to achieve a temperature required for absorption, and an absorbing reactor is benefited by the temperature increase thereby reducing the amount of heating required for desorption. Thus, desorbing and absorbing reactors are respectively benefited as is the overall efficiency of the system.

Solid reactants suitable for forming the solid sorbent compositions useful in the present invention include absorbents such as metal oxides, sulfides, sulfates and metal hydrides, and zeolites, activated carbon, activated alumina, and silica gel. Such absorbents may be reacted with polar or non-polar gaseous reactants. Suitable non-polar gaseous reactants include natural gas $C_1$-$C_6$ lower alkanes (e.g., methane, ethane, propane, etc.), cryogenic refrigerants (helium, argon and hydrogen), environmental gases (oxygen, nitrogen, hydrogen, $NO_x$, $CO_2$ and CO) and the fluorocarbon CFC, HCFC and HFC refrigerants. Of the aforesaid, preferred systems use zeolites or activated carbon with fluorocarbons or polar gas refrigerants water or ammonia, or a metal hydride with hydrogen. However, the preferred solid sorbent compositions are the complex compounds formed between an inorganic metal salt and a polar gas refrigerant. Adsorption of the polar gas on the salt is carried out in a chemisorption reaction to yield the complex compound. Preferred metal salts are selected from alkali and alkaline earth metals, transition metals, aluminum, zinc, cadmium and tin. Preferred transition metals are manganese, iron, nickel and cobalt. Preferred metal salts include nitrates, nitrites, perchlorates, oxalates, sulfates, sulfites, and halides, particularly chlorides, bromides and iodides of the metals. Preferred polar gases include ammonia, water, methylamine and ethanol, ammonia being especially preferred. Other suitable polar refrigerants include sulfur dioxide, lower alkanols, alkylamines, polyamines and phosphine. These as well as other suitable and preferred reactants and resulting complex compounds are disclosed in the aforesaid patents, particularly U.S. Pat. Nos. 5,441,716 and 5,628,205, incorporated herein by reference. Particularly preferred systems are opposing reactors or banks or series of reactors incorporating one or more of the following complex compounds:

$BaCl_2.0-8(NH_3)$, $SrCl_2.1-8(NH_3)$, $SrBr_2.2-8(NH_3)$, $CaCl_2.0-1(NH_3)$, $CaCl_2.1-2(NH_3)$, $CaCl_2.2-4(NH_3)$, $CaCl_2.4-8(NH_3)$, $CaBr_2.2-6(NH_3)$, $NiCl_2.2-6(NH_3)$, $FeCl_2.2-6(NH_3)$, $FeBr_2.2-6(NH_3)$, $CoCl_2.2-6(NH_3)$, $CoBr_2.2-6(NH_3)$, $MgCl_2.2-6(NH_3)$, $MgBr_2.2-6(NH_3)$, $MnCl_2.2-6(NH_3)$, $MnBr_2.2-6(NH_3)$, $CuSO_2.2-6(NH_3)$, $ZnCl_2.1-4(NH_3)$, $NaBF_4.0-3(NH_3)$ and $LiCl..1-3(NH_3)$.

A system of opposing and alternately absorbing and desorbing gaseous reactants on the solid sorbent compositions may also include staged reactors such as described in U.S. Pat. Nos. 5,079,928 and 5,263,330. In addition, pairs or banks of opposing stage reactors may also be used. In such multiple-staged compound systems, as well as the single-staged systems, it is advantageous to include heat exchange loop plumbing for directing heat transfer fluid or fluids between the reactors to take advantage of the ΔT between absorbing and desorbing reactors using such staging for cooling a desorbed reactor to a lower temperature in order to initiate absorption, and to assist in heating an absorbed reactor prior to initiating desorption, further increases the efficiency of the system. However, the present invention may substitute, complement, or replace heating and cooling heat exchange hardware and components used in the previously described systems and known in the art and which use pumped flow or phase-change fluids and require complex piping and other components, whereby the size and cost of the absorption system and its operation may be significantly reduced.

An example of one embodiment of a system 10 according to the invention is schematically illustrated in FIG. 1. The illustrated apparatus includes a first solid phase reactor 22 and a second solid phase reactor 24. The reactors 22, 24 are connected with one another through recuperation line conduits 23 and 25, and an electronically controllable valve 30. The valve 30 may be a solenoid valve or any other type of electronically controllable valve known to those of skill in the art. The valve 30 communicates with a control system 31 that opens and closes the valve to control fluid or gas flow between the reactors 22, 24.

A flow meter 21 is located along conduit 25 and measures the flow of fluid or gas between the reactors 22, 24. In addition, a pressure transducer 26 is located along conduit 23 and configured to measure the pressure existing in the line between the reactors 22, 24. The flow meter 21 and the pressure transducer 26 are in electrical communication with the control system 31 to provide pressure and flow readings to the control system. The cooling system further comprises a temperature sensor 29 configured to detect the temperature of the gas reactant in the conduit 23.

As will be explained in more detail below, the control system 31 is programmed to receive pressure and flow readings from the conduits 23 and 25 and operate the valve 30 when required to increase the efficiency of the system 10.

A heat transfer fluid is directed into the heat exchange component of reactor 24 via a pipe 34 and out from the reactor via a pipe 31. Similarly, heat transfer fluid is directed into reactor 22 from a pipe 32 and out from a pipe 33. Pipe 27 communicates with reactor 22 and directs refrigerant vapor desorbed from reactor 22 to a system condenser or energy recovering reactor (not shown) and may be used for returning refrigerant vapor from a system evaporator or reactor (not shown) to the reactor 22. Similarly, pipe 28 communicates with reactor 24 and is used for directing refrigerant vapor to and from reactor 24.

During the controllable recuperation process the control system 31 causes the valve 30 to control the time that the reactors 22 and 24 are connected together. Opening the valve 30 results in a mass transfer from whichever is the higher-temperature reactor to the lower-temperature reactor, which results in reducing the temperature of the higher-temperature reactor and increasing the temperature of the lower-temperature reactor. This results in an increased efficiency in the overall operation of the system 10 because of the thermal transfer from the higher temperature reactor to the lower temperature reactor, which reduces the energy required to heat the lower temperature reactor during each half-cycle.

FIG. 2 shows more details of the control system 31. As indicated, the control system 31 includes a processor 101 linked to a lookup table 105, a valve control module 110, a thermal sensor interface 115, and a demand analysis module 120. The demand analysis module senses the current demand on the system, and allows the controller 31 to adjust capacity when the demand is below a predetermined threshold in order to increase efficiency.

For example, the demand analysis module may continually sense the thermal demand for cooling on the systems, and continually adjust the equalization time between the two reactors by reference to the lookup table 105. One example of a lookup table is shown below as Table 1. Of course, aspects of the invention are not limited to referencing a lookup table. The system may reference a pre-stored or predetermined data curve of equalization times and refrigerator demands. The system may also refer to a particular equation to calculate the proper amount of equalization time given a particular cooling/refrigeration demand. However, it should be realized that each type of system may have a different table, equation or curve based on the system's capacity and overall features.

TABLE 1

Example System Lookup Table

| Equalization Time (mins) | Cooling/Refrigeration Demand(Btu/hr) |
|---|---|
| 0.5 | 18000 |
| 0.75 | 17700 |
| 1 | 17500 |
| 1.5 | 17300 |
| 2 | 17160 |

TABLE 1-continued

Example System Lookup Table

| Equalization Time (mins) | Cooling/Refrigeration Demand(Btu/hr) |
| --- | --- |
| 3 | 17000 |
| 4 | 16850 |

The system may being the equalization process at any time during each cycle. However in some embodiments, the system will begin the equalization process when the absorber and desorber pressures are within a certain bar of pressure in comparison to the system's condenser. In one embodiment, the condenser is within two or three bars of pressure within the absorber and the desorber. In this example, the condenser may have a pressure of 20 bar, while the absorber has a pressure of 17 bar and the desorber has a pressure of 23 bar. When the demand analysis module determines that the absorber and desorber are within this pressure range with the condenser, then the system can be placed into an energy efficiency optimization mode wherein the cycle pressure equalization time between the absorber and the desorber is controlled to maximize the efficiency of the system.

It should be realized that the system is not limited to this particular set of pressures to begin optimizing the efficiency of the system 31. For example, the demand analysis module may determine that a pressure difference of 2, 3, 4, 5, 6, 7, 8, 9, 10 or more bars of pressure between the absorber, desorber and condenser is the proper trigger for optimizing the efficiency of the system 31.

In one embodiment, the equalization time used in the system is optimized to increase the overall efficiency of the system. For example, before the discovery of the benefits and effects of cycle pressure equalization as described herein were known, typical recovery periods of about 4 minutes were used within each system. However, it was discovered that shorter periods between about 20 seconds and 4 minutes were found to be advantageous. In some embodiments, it was found that periods as long as 4 minutes rarely increased efficiency, as capacity declines in the system exceeded gains in efficiency. This was particularly discovered when recovery times approached 4 minutes. For this reason, providing the system with an intelligent means for adjusting the equalization time provided a system that could run with greater efficiency during times of reduced demand and yet still be flexible enough to provide greater capacity when demand was high.

In some embodiments, the two reactors can be supplied with $CaBr_2$, with ammonia adsorbed on the salt to provide a complex compound for adsorption and desorption between the coordination steps $CaBr_2.2\text{-}6$. Both reactors can be heated and cooled, respectively, using Syltherm XLT™ heat transfer fluid. The system is run for half-cycle absorption/desorption periods and between each half-cycle the valve can be controlled to provide a variable-length equilibrium time between each half cycle.

Typically, chemisorption reaction cycles are carried out with absorption and desorption reactions running substantially concurrently. However, the process of the invention may also be used in systems having multiple reactors or multiple banks of reactors which are intentionally programmed to operate out of phase. Such operation may be especially useful in a system designed for continuous cooling and/or freezing wherein desorption is desirably carried out more rapidly than absorption, such as described in U.S. Pat. No. 5,628,205. In such applications, any desorbing reactor in which desorption is almost completed may be coupled with an absorbing reactor benefiting from such gaseous refrigerant transfer and/or an almost completed absorbing reactor may be coupled with a benefiting desorbing reactor.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A cooling system, comprising:
   a first reactor system comprising one or more first reactors configured to adsorb and desorb a gaseous reactant onto a first solid sorbent composition;
   a second reactor system comprising one or more second reactors configured to adsorb and desorb the gaseous reactant onto a second solid sorbent composition;
   a conduit connecting the one or more first reactors of the first reactor system to the one or more second reactors of the second reactor system, and comprising a controllable valve; and
   an electronic controller configured to control a recuperation time between the first reactor system and the second reactor system by operating the controllable valve to equalize the pressure of the reactant gas between the first reactor system and the second reactor system and by detecting an external demand on the cooling system and altering the amount of time the valve is opened based on the external demand.

2. The cooling system of claim 1, wherein the electronic controller controls the recuperation time by reference to a stored equation, a predefined data curve, or a lookup table to alter the amount of time the valve is opened.

3. The cooling system of claim 1, wherein the cooling system further comprises a temperature sensor configured to detect the temperature of the gas reactant in the conduit.

4. The cooling system of claim 1, wherein the cooling system further comprises a pressure transducer configured to determine the pressure of the gas reactant in the conduit.

5. The cooling system of claim 4, wherein the electronic controller is configured to determine the pressure of the reactant gas in the conduit before equalizing the pressure of the reactant gas.

6. The cooling system of claim 1, wherein the one or more first reactors comprises a complex compound formed by absorbing ammonia on a metal salt.

7. The cooling system of claim 6, wherein the one or more second reactors comprises a complex compound formed by absorbing ammonia on a metal salt.

8. The cooling system of claim 1, wherein the one or more first reactors or the one or more second reactors comprises a solid sorbent having a zeolite, activated carbon, activated alumina or silica gel.

9. The cooling system of claim 1, wherein the one or more first reactors and the one or more second reactors comprise the same sorbent composition.

10. A method of controlling a cooling system, comprising:
    providing a first reactor system comprising one or more first reactors configured to adsorb and desorb a gaseous reactant onto a first solid sorbent composition;
    providing a second reactor system comprising one or more second reactors configured to adsorb and desorb the gaseous reactant onto a second solid sorbent composition;
    providing a conduit connecting the one or more first reactors of the first reactor system to the one or more second reactors of the second reactor system, and comprising a controllable valve; and
    electronically controlling a recuperation time between the one or more first reactors and the one or more second reactors by operating the controllable valve to equalize the pressure of the reactant gas between the first reactor system and the second reactor system, wherein electronically controlling the recuperation time comprises detecting an external demand on the cooling system and altering an amount of time the valve is opened to equalize the pressure based on the detected external demand.

11. The method of claim 10, wherein altering the amount of time the valve is opened is based on reference to a stored equation, a predefined data curve, or a lookup table.

12. The method of claim 10, further comprising measuring the temperature of the gas reactant in the conduit.

13. The method of claim 10, further comprising measuring the pressure of the gas reactant in the conduit.

14. The method of claim 13, wherein measuring the pressure of the gas comprises determine the pressure of the reactant gas in the conduit before equalizing the pressure of the reactant gas.

15. The method of claim 10, wherein the one or more first reactors comprises a complex compound formed by absorbing ammonia on a metal salt.

16. The method of claim 15, wherein the one or more second reactors comprises a complex compound formed by absorbing ammonia on a metal salt.

17. The method of claim 10, wherein the one or more first reactors or the one or more second reactors comprises a solid sorbent having a zeolite, activated carbon, activated alumina or silica gel.

18. The method of claim 10, wherein the one or more first reactors and the one or more second reactors comprise the same sorbent composition.

* * * * *